United States Patent
Miyabo

(12) 
(10) Patent No.: US 6,288,145 B1
(45) Date of Patent: Sep. 11, 2001

(54) HIGH-MELTING POLYAMIDE RESIN COMPOSITIONS AND MOLDED ARTICLES THEREOF

(75) Inventor: Atsushi Miyabo, Fushimi-Ku Kowtow (JP)

(73) Assignee: E. I. du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 09/355,234

(22) PCT Filed: Jan. 1, 1998

(86) PCT No.: PCT/US98/01623

§ 371 Date: Jul. 26, 1999

§ 102(e) Date: Jul. 26, 1999

(87) PCT Pub. No.: WO98/33849

PCT Pub. Date: Aug. 6, 1998

(30) Foreign Application Priority Data

Jan. 30, 1997 (JP) .................................................... 9-016633

(51) Int. Cl.$^7$ ................................. C08K 3/10; C08L 63/04
(52) U.S. Cl. ............................................. 523/457; 523/460
(58) Field of Search ....................................... 523/457, 460

(56) References Cited

U.S. PATENT DOCUMENTS

| | | | |
|---|---|---|---|
| 4,498,957 | * 2/1985 | Sasaki et al. | 162/146 |
| 4,962,162 | * 10/1990 | Kosuda et al. | 525/422 |
| 5,262,478 | * 11/1993 | Nishio et al. | 525/68 |
| 5,575,949 | * 11/1996 | Benicewicz et al. | 252/299.01 |

FOREIGN PATENT DOCUMENTS

04001266 * 4/1990 (JP).
95/18178 * 7/1995 (WO).

* cited by examiner

Primary Examiner—Robert Dawson
Assistant Examiner—D. Aylward

(57) ABSTRACT

High-melting polyamide resin compositions having improved mechanical properties, and molded articles for electrical and electronic components made using the same. The high-melting polyamide resin compositions comprise an aromatic polyamide having a melting point of 280° C. to 340° C. and glycidyl isocyanurate, a novolak-epoxy, or mixtures thereof.

6 Claims, No Drawings

HIGH-MELTING POLYAMIDE RESIN COMPOSITIONS AND MOLDED ARTICLES THEREOF

FIELD OF THE INVENTION

The present invention relates to high-melting polyamide resin compositions having improved mechanical properties. More specifically, it relates to polyamide resin compositions in which the mechanical properties have been enhanced while maintaining the reflow heat temperature resistance of the high-melting polyamide, and also to molded articles for electrical and electronic components made of the same.

BACKGROUND OF THE INVENTION

Electrical and electronic components such as connectors have recently been undergoing dramatic increases in performance. This trend is especially striking in connectors used in surface-mount technology (SMT), where molding materials with high flame retardance, high flowability, high melt stability, high mechanical properties, and a high reflow heat temperature resistance are required.

Thermoplastic resins which have hitherto been used to mold SMT connectors include aromatic polyamides, polytetra-methylene adipamide, a polymer of tetramethylene diamine and adipic acid ("nylon 46"), polyphenylene sulfide and liquid crystal polymers. However, in the case of aromatic polyamides and nylon 46, it is generally necessary to carry out flame-retarding treatment in order to achieve the high flame retardance required, which means attaining a UL 94 rating of V-0. Various methods exist for carrying out flame-retarding treatment, although polyamides are generally flame-retarded by a method involving the addition of a flame retardant. However, when a low-molecular-weight flame retardant is used and a flowability enhancer such as a wax is also added to elicit a high flowability, the mechanical properties intrinsic to the polyamide are lost. Also, the reflow heat temperature resistance decreases by adding a low-molecular-weight flame retardant. Therefore, polyamide resin compositions endowed with the high flame retardance, high flowability, high melt stability, high functional properties, and high reflow heat temperature resistance required of SMT connector molding materials have yet to achieved.

The use of epoxy group-containing compounds, such as glycidyl isocyanurate and novolak-epoxy resins, as binders in paints is well known, but these compounds have not often been used as additives for enhancing the properties of resins. One case in which they have been used as resin additives is in methods for the stabilization of flame-retarded resin compositions characterized by the use of glycidyl isocyanurate, either alone or in combination with other compounds, as the heat stabilizer in resin composites of styrene resin and carbonate resins that have been flame-retarded using brominated flame retardants (Japanese Unexamined Patent Application Disclosure [Kokai] Nos. 2-279, 763 (1990) and 4-266,956 (1992)). However, because general-purpose resin composites of styrene and carbonate resins such as this have a heat resistance that is far inferior to that of polyamides, they cannot be used as the molding materials for electrical and electronic components such as SMT connectors.

SUMMARY OF THE INVENTION

This invention provides a polyamide resin composition comprising a polyamide having a melting point of 280 to 340° C. and an epoxy group-containing compound. The epoxy group-containing compound is preferably glycidyl isocyanurate, novolak-epoxy resin, or mixtures thereof.

The polyamide is preferably an aromatic polyamide.

The resin composition may additionally comprise an inorganic filler, and also (a) a brominated flame retardant and (b) a co-flame retardant which is antimony-based or zinc borate-based.

The flame retarding resin composition may further comprise hydrotalcite.

This invention also provides molded articles for electrical and electronic components made with such compositions.

DETAILED DESCRIPTION OF THE INVENTION

The polyamide used in the present invention has a melting point of 280° C. to 340° C. and can be used in injection molding. Examples include:

(1) polyamides obtained by the polycondensation of diamine constituents and dicarboxylic acid constituents, the former being at least one diamine selected from the group consisting of aliphatic alkylenediamines, aromatic diamines and alicyclic diamines, and the latter being at least one dicarboxylic acid selected from the group consisting of aliphatic dicarboxylic acids and aromatic dicarboxylic acids;

(2) polyamides obtained by ring opening polymerization from lactam;

(3) polyamides obtained by the polycondensation of an aminocarboxylic acid; and (4) blends thereof.

The aliphatic alkylenediamines in (1) may be straight-chained or branched, and may be used alone or as combinations of two or more thereof. Specific examples of these aliphatic alkylenediamines are ethylenediamine, trimethylenediamine, tetramethylenediamine, pentamethylenediamine, hexamethylenediamine, 1,7-diamino-heptane, 1,8-diaminooctane, 1,9-diaminononane, 1,10-diaminodecane, 2-methylpenta-methylenediamine and 2-ethyltetramethylenediamine.

The aromatic diamines in (1) may be used alone or as a combination of two or more thereof. Specific examples include para-phenylenediamine, ortho-phenylenediamine, meta-phenylenediamine, para-xylylenediamine and meta-xylylene-diamine.

The alicyclic alkylenediamine in (1) may be used alone or as a combination of two or more thereof. Specific examples include 1,3-diaminocyclohexane, 1,4-diaminocyclohexane, 1,3-bis(aminomethyl)cyclohexane, bis(aminomethyl) cyclohexane, bis(4-aminocyclohexyl)methane, 4,4'-diamino-3,3'-dimethyldicyclohexylmethane, isophoronediamine and piperazine.

The aliphatic dicarboxylic acid in (1) may be used singly or as a combination of two or more thereof. Specific examples include adipic acid, sebacic acid, azelaic acid and dodecanedioic acid.

The aromatic dicarboxylic acid in (1) may be used singly or as a combination of two or more thereof. Specific examples include terephthalic acid, isophthalic acid, phthalic acid, 2-methylterephthalic acid and naphthalenedicarboxylic acid.

The lactam in (1) may be used singly or as a combination of two or more thereof. Specific examples include butyl lactam, pivalolactam, caprolactam, capryl lactam, enantholactam, undecanolactam and dodecanolactam.

Examples of (3) are polymerizable ω-amino acids, which may be used singly or as a combination of two or more thereof. Specific examples include 6-aminocaproic acid, 7-aminoheptanoic acid, 9-aminononanoic acid, 11-aminoundecanoic acid and 12-aminododecanoic acid.

The high-melting polyamides used in the present invention may include aromatic polyamides and nylon 46, with melting points of 280° C. to 340° C. They are particularly suitable as resins which have the heat resistance and mechanical properties required of the molded articles, as well as excellent thermal stability during molding, and which are suitable also from the standpoint of cost. Examples of aromatic polyamides include injection-moldable aromatic polyamides, blends of two or more aromatic polyamides, and blends of an aromatic polyamide with another polyamide. Aromatic polyamides which are composed of hexamethylenediamine, terephthalic acid and adipic acid, and in which decreased rigidity and dimensional changes do not occur with moisture absorption, are especially desirable.

When epoxy group-containing compounds are blended with those high-melting polyamides, the mechanical properties of the resin composition are enhanced, while maintaining the reflow heat temperature resistance. Specific examples of these epoxy group-containing compounds are glycidyl isocyanurates and novolak-epoxy resins. These may be used alone or as combinations of two or more thereof.

Examples of glycidyl isocyanurates include monoglycidyl isocyanurate, diglycidyl isocyanurate and triglycidyl isocyanurate. Triglycidyl isocyanurate is especially preferred.

"Novolak-epoxy resin" is a generic name for compounds in which the hydroxyl groups of phenols that have been condensed using an acid catalyst are substituted with epoxy groups. Examples of the phenol include unsubstituted phenol and cresol, with cresol-novolak resin being especially preferable.

The amount of the epoxy group-containing compound selected in the compositions of the present invention is based on such considerations as the required properties of the molded articles and the type of epoxy group-containing compound used. Generally the amount of epoxy group-containing compound is 0.01 to 1.0% by weight, preferably 0.02 to 0.5% by weight, and most preferably 0.05 to 0.3% by weight, based on the weight of the resin composition. When less is used, not only is there no apparent practical improvement in the mechanical properties, but this becomes a cause of poor dispersion, making it impossible to obtain resin compositions of stable quality. Moreover, even when included in a large amount, no further improvement in the mechanical properties is observed; instead the reflow heat temperature resistance decreases, which has the undesirable effect of causing a decline in the percent melt viscosity retention.

Conventional inorganic fillers for reinforcing engineering polymers can also be blended in the resin compositions of the present invention. Specific examples of fillers are glass fibers, glass flakes, kaolin, clay, talc, wollastonite, calcium carbonate, silica, carbon fibers and potassium titanate. The amount of the inorganic filler is suitably set in accordance with the required properties of the molded articles, this generally being about 5 to 60% by weight, based on the weight of the resin composition.

The technique of enhancing the mechanical properties of the high-melting polyamide by blending into the high-melting polyamide a suitable epoxy group-containing compound such as glycidyl isocyanurate or novolak-epoxy resin can similarly be used with flame-retarded resin compositions. For example, by additionally blending in a brominated flame retardant, flame retardance can be conferred while retaining the effect of enhancing the mechanical properties.

Any known brominated flame retardants may be used. Specific examples include polydibromostyrene, polytribromostyrene, polypentabromostyrene, decabromodiphenyl, tetrabromodiphenyl, hexabromodiphenyl ether, octabromodiphenyl ether, decabromodiphenyl ether, tetrabromodiphenyl sulfide, polypentabromobenzyl acrylate, brominated phenoxy resins and epoxy-terminal brominated phenoxy resins. The brominated polystyrenes such as polydibromostyrene are prepared by brominating polystyrene or poly($\alpha$-methylstyrene), or by polymerizing brominated styrene or brominated $\alpha$-methylstyrene.

The flame retardant may be used alone or as a mixture of two or more thereof. Moreover, the flame retardant may be a homopolymer, or it may be a copolymer that includes acid anhydride groups in order to enhance compatibility with the polyamide. One can use a brominated polystyrene having a bromine content of 50 to 70%, brominated polyphenylene ether, or a copolymer of brominated polystyrene with maleic anhydride.

The amount of the brominated flame retardant is selected in accordance with such considerations as the level of flame-retardance required in the molded articles, and the types of polyamide and flame retardant used.

In cases where the articles to be molded have a complex shape or are extremely small, the resin composition must have a high flowability. Low-molecular-weight flame retardants are used to obtain a high flowability, but the mechanical properties of the resin composition are generally compromised by low-molecular-weight flame retardants. However, in the compositions of the present invention, the mechanical properties intrinsic to polyamides can be retained even when low-molecular-weight flame retardants are blended in.

An antimony-based co-flame retardant or a zinc borate co-flame retardant may be used together with the flame retardant. The amount of the co-flame retardant is selected in the same manner as for the flame retardant, although addition of an excessive amount has an adverse effect on the mechanical properties.

Examples of the antimony co-flame retardant include antimony trioxide, antimony tetraoxide, antimony pentaoxide and sodium antimonate. Antimony pentaoxide and sodium antimonate are preferable in terms of the processability when the high-melting polyamide is molded.

There are known to be several differing crystal forms for zinc borate-type co-flame retardants; one can use those containing water of crystallization or those which are anhydrous. In general, there are no particular restrictions so long as this is a compound represented by the formula $xZnO \cdot yB_2O_3 \cdot zH_2O$.

The co-flame retardant may be used alone or as a mixture of two or more thereof.

In cases where flame retardancy has been imparted to the resin composition by blending in a flame retardant and a co-flame retardant, it is possible to additionally blend in hydrotalcite. Hydrotalcite is a hydrous basic carbonate mineral of magnesium and aluminum represented as $Mg_6Al_2(OH)_{16}CO_3 \cdot 4H_2O$. This may be of natural origin or synthetic. Blending in hydrotalcite serves to trap the halogens on the flame retardant, thereby enhancing the resistance to metal corrosion. The hydrotalcite content is selected in accordance with the required properties of the molded articles, and is generally 0.01 to 1.0% by weight, preferably 0.02 to 0.5% by weight, and most preferably 0.05 to 0.3% by weight, based on the weight of the resin composition.

In addition to the ingredients mentioned above, additives such as heat stabilizers, plasticizers, antioxidants, nucleating agents, dyes, pigments, parting agents and impact modifiers can be blended into the resin compositions of the invention in amounts that do not compromise the properties of the composition.

The resin compositions of the present invention can be prepared by any known method of preparation. For example, preparation may be carried out by melt kneading using a kneading apparatus such as a Banbury mixer, an extruder or any of various types of kneaders. The kneading sequence may be such that all the ingredients are kneaded at one time, or may involve feeding the ingredients from side feeders.

EXAMPLES

Examples of the invention are given below by way of illustration, not by way of limitation.

Working Examples 1–8. Comparative Examples 1–5

After dry blending the various ingredients shown in Table 1, melt kneading was carried out with a twin-screw extruder (ZSK-40, manufactured by W&P Co.), then water-cooled and formed into pellets.

The various ingredients mentioned in Table 1 are as follows:

Base resin 6T/66: Aromatic polyamide pellets composed of terephthalic acid/hexamethylenediamine and adipic acid/hexamethylenediamine in a molar ratio of 55:45, and melting of about 310° C.

Base resin 66: Nylon 66 manufactured by DuPont. Trade name, Zytel 101. Melting point, about 265° C.

Glass fibers: Chopped strands (length, 3 mm) manufactured by Nippon Sheet Glass.

Polydibromostyrene: Manufactured by Great Lakes. Trade name, PDBS80. Molecular weight, 120,000.

Tribromopolystyrene: Manufactured by Ferro Corp. Trade name, "Pyro-Chek" 68PBC. Molecular weight, 375,000.

DBS-MA: Dibromostyrene/maleic anhydride copolymer (maleic anhydride content, 0.4 wt %)

Sodium antimonate: Manufactured by Nissan Chemical Industries. Trade name, "Sunepoch" NA1070L Antimony trioxide: Manufactured by PPG. Trade name, PE80.

TGIC: Triglycidyl isocyanurate

CNE: Cresol-novolak-epoxy resin

Using the resulting pellets, the melt viscosity of the composition was measured at a resin temperature of 330° C. with a "Kayeness" Co. rheometer.

Test pieces measuring 13×130×3.2 mm were molded from the pellets obtained with an injection molding machine manufactured by Sumitomo-Nestal Co., and the mechanical properties were measured by the methods indicated below.

Tensile Strength: ASTM D638-95

Elongation at Break: ASTM D638-95

Flexural Modulus: ASTM D790-95a

Izod notched impact strength: ASTM D256-93a

Flame retardance: UL-94

The melt viscosity was measured after 3 minutes at a melting temperature of 330° C. and a shear stress of 1,000 $\text{sec}^{-1}$. The percent melt viscosity retention was calculated with the following formula:

Percent melt viscosity retention(%)=(melt viscosity after hold up)/(standard melt viscosity)×100

Standard melt viscosity refers to the melt viscosity measured at a melt temperature of 330° C., a shear rate of 1,000 $\text{sec}^{-1}$ and a residence time of 3 minutes. The residence melt viscosity after hold up refers to the melt viscosity measured at a melt temperature of 330° C., a shear rate of 1,000 $\text{sec}^{-1}$, and a residence time of 30 minutes.

Using the pellets thus obtained, UL combustion test specimens having a thickness of 0.8 mm were fabricated, and the reflow heat temperature resistance was measured. The reflow heat temperature resistance was obtained by moisture conditioning the test specimen for 96 hours at 40° C. and a relative humidity of 95%, then passing it through an IR reflow apparatus under the following conditions: pre-heating, 80 seconds at 150° C.; conveyor speed, 40 cm/min; 1 cycle, 300 seconds; time to maximum peak temperature, 240 seconds after starting. The maximum peak temperature at which blistering did not arise in the test piece was measured, and this was taken as the reflow heat temperature resistance.

Flame retardance was measured in accordance with UL 94.

TABLE 1

| | Working Examples | | | | | | | | Comparative Examples | | | | |
|---|---|---|---|---|---|---|---|---|---|---|---|---|---|
| | 1 | 2 | 3 | 4 | 5 | 6 | 7 | 8 | 1 | 2 | 3 | 4 | 5 |
| Base resin | 6T/66 | 6T/66 | 6T/66 | 6T/66 | 6T/66 | 6T/66 | 6T/66 | 6T/66 | 6T/66 | 6T/66 | 6T/66 | 66 | 66 |
| Glass fibers (wt %) | 30 | 30 | 30 | 30 | 30 | 30 | 30 | 30 | 30 | 30 | 30 | 25 | 25 |
| Polydibromostyrene (wt %) | 24 | 24 | 24 | 24 | 24 | 24 | 24 | 22 | 24 | — | 22 | — | — |
| Tribromopolystyrene (wt %) | — | — | — | — | — | — | — | — | — | 24 | — | 23 | 23 |
| DBS-MA (wt %) | — | — | — | — | — | — | — | 2 | — | — | 2 | — | — |
| Sodium antimonate (wt %) | 4 | 4 | 4 | 4 | 4 | 4 | 4 | 4 | 4 | 4 | 4 | — | — |
| Antimony trioxide (wt %) | — | — | — | — | — | — | — | — | — | — | — | 4 | 4 |
| TGIC (wt %) | 0.075 | 0.1 | 0.3 | — | — | — | — | — | — | — | — | — | 0.075 |
| CNE (wt %) | — | — | — | 0.025 | 0.075 | 0.125 | 0.3 | 0.075 | — | — | — | — | — |
| Hydrotalcite (wt %) | 0.075 | 0.1 | — | 0.025 | 0.075 | 0.125 | 0.3 | 0.075 | — | — | — | — | 0.075 |
| Tensile strength (MPa) | 185 | 181 | 177 | 163 | 188 | 186 | 162 | 174 | 150 | 193 | 119 | 160 | 162 |
| Elongation at break (%) | 2.3 | 2.2 | 2.1 | 2.0 | 2.3 | 2.2 | 1.9 | 2.0 | 1.8 | 2.1 | 1.4 | 2.5 | 2.5 |
| Flexural modulus (MPa) | 10688 | 10095 | 10305 | 10418 | 10422 | 10637 | 10437 | 10089 | 10189 | 10390 | 9761 | 9071 | 9086 |
| Notched Izod (J/m) | 103 | 111 | 110 | 82 | 108 | 111 | 99 | 83 | 73 | 93 | 48 | 91 | 88 |
| Melt viscosity | 99 | 110 | 108 | 91 | 97 | 95 | 87 | — | 87 | 147 | 95 | — | — |

TABLE 1-continued

|  | Working Examples | | | | | | | | Comparative Examples | | | | |
| --- | --- | --- | --- | --- | --- | --- | --- | --- | --- | --- | --- | --- | --- |
|  | 1 | 2 | 3 | 4 | 5 | 6 | 7 | 8 | 1 | 2 | 3 | 4 | 5 |
| Percent melt viscosity retention (%) | — | 68 | 58 | — | — | — | — | — | 78 | — | — | — | — |
| Reflow heating temperature resistance (° C.) | 220 | 220 | 220 | 230 | 230 | 230 | 210 | 250 | 220 | 260 | 250 | — | — |
| Flame retardance (UL 94) | V-0 | V-0 | V-0 | V-0 | V-0 | V-0 | V-0 | V-0 | V-0 | V-0 | V-0 | V-0 | V-0 |

When the results obtained in Working Examples 1 to 3 are compared with those in Comparative Example 1, it is apparent that adding triglycidyl isocyanurate greatly enhances the mechanical properties while maintaining the reflow heat temperature resistance. When the results obtained in Working Examples 2 and 3 are compared, it is apparent that the addition of 0.3% by weight of triglycidyl isocyanurate in Working Example 3 produces an improvement in mechanical properties, yet no further improvement can be seen over the measured values for the mechanical properties in Working Example 2 and a decline is evident in the percent melt viscosity retention. It is apparent from this that, in cases where an especially good melt stability is required, care must be taken in the amount of triglycidyl isocyanurate added.

Upon comparing Working Examples 4 to 7 with Comparative Example 1, it is apparent that the mechanical properties greatly improve with the addition of cresol novolak-epoxy resin. Moreover, in Working Examples 4 to 6, it is apparent that the reflow heat temperature resistance has risen 10° C. relative to Comparative Example 1. When Working Example 6 and Working Example 7 are compared, it is apparent that the addition of 0.3% by weight of cresol novolak-epoxy resin as in Working Example 7 produces an improvement in the mechanical properties, yet the degree of such improvement is low compared with the measured values for the mechanical properties in Working Example 6; moreover, such addition results in a decrease in the reflow heat temperature resistance. In cases where a very high reflow heat temperature resistance is required, it is necessary to exercise care with the amount of addition.

The flame retardant used in Working Example 4 and Comparative Example 1 was polydibromostyrene in both cases. This has a lower viscosity than the tribromopolystyrene used as the flame retardant in Comparative Example 2. One method for giving the resin composition a high flowability is to use a low-viscosity flame retardant. When Comparative Example 1 and Comparative Example 2 are compared, it is apparent that Comparative Example 1, in which the low-viscosity flame retardant was used, has a lower resin composition melt viscosity. However, the mechanical properties of Comparative Example 1 are inferior to those of Comparative Example 2. Working Example 4 has a low melt viscosity roughly comparable with that of Comparative Example 1, and a tensile strength and notched Izod impact strength that are better than those of Comparative Example 1. The elongation at break and flexural modulus are both as good as in Comparative Example 2.

When Working Example 8 and Comparative Example 3 are compared, it is apparent that an enhancement in the mechanical properties is obtained even when a dibromostyrene/maleic anhydride copolymer is used in a system together with dibromostyrene. A comparison of Working Example 5 and Working Example 8 shows that the reflow heat temperature resistance becomes higher with the use of a dibromostyrene/maleic anhydride copolymer together with dibromostyrene, as in Working Example 8. It is apparent that a brominated flame retardant which is a copolymer containing acid anhydride groups is preferable in cases where a very high reflow heat temperature resistance is required.

Upon comparing Comparative Example 5 and Comparative Example 6, it is apparent that an enhancement in the mechanical properties does not occur even when triglycidyl isocyanurate is added to nylon 66. This is thought to be due to the fact that, because the melting point of nylon 66 is 265° C., the reaction of triglycidyl isocyanurate does not readily arise at the process temperature.

As described above, because the resin compositions of the present invention use a polyamide that melts at 280° C. to 340° C. and an epoxy group-containing compound such as glycidyl isocyanurate or an novolak-epoxy resin, the mechanical properties of the high-melting polyamide are greatly improved, in addition to which the reflow heat temperature resistance of the high-melting polyamide can be maintained. Moreover, when the resin compositions of the invention that have been obtained by blending into the resin composition inorganic filler, a brominated flame retardant, and an antimony-based co-flame retardant or zinc borate co-flame retardant, molded articles for electrical and electronic components that have improved mechanical properties and excellent heat resistance can be provided.

What is claimed is:

1. A polyamide resin composition comprising an aromatic polyamide having a melting point of 280° C. to 340° C. and an epoxy group containing compound, wherein said epoxy group-containing compound is glycidyl isocyanurate, novolak-epoxy resin, or mixtures thereof.

2. The composition of claim 1 additionally comprising an inorganic filler.

3. The composition of claim 1 or 2 additionally comprising (a) a brominated flame retardant and (b) a co-flame retardant which is antimony-based or zinc-borate based.

4. The composition of claim 3 which additionally comprises hydrotalcite.

5. Molded articles for electrical and electronic components of the composition of claim 3.

6. Molded articles for electrical and electronic components of the composition of claim 4.

* * * * *